US011165234B2

(12) United States Patent
Hikosaka et al.

(10) Patent No.: US 11,165,234 B2
(45) Date of Patent: Nov. 2, 2021

(54) SPACE-EFFICIENT ELECTRICAL JUNCTION BOX FOR VEHICLES

(71) Applicant: SUMITOMO WIRING SYSTEMS, LTD., Mie (JP)

(72) Inventors: Kazuki Hikosaka, Mie (JP); Hironari Tanaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 281 days.

(21) Appl. No.: 16/286,906

(22) Filed: Feb. 27, 2019

(65) Prior Publication Data

US 2019/0273372 A1   Sep. 5, 2019

(30) Foreign Application Priority Data

Mar. 5, 2018   (JP) .............................. JP2018-038900

(51) Int. Cl.
*H02G 3/16* (2006.01)
*B60R 16/023* (2006.01)

(52) U.S. Cl.
CPC .......... *H02G 3/16* (2013.01); *B60R 16/0239* (2013.01)

(58) Field of Classification Search
None
See application file for complete search history.

(56) References Cited

U.S. PATENT DOCUMENTS

| | | | | |
|---|---|---|---|---|
| 2,431,999 A | * | 12/1947 | Engelhardt | H02G 3/16 439/718 |
| 4,591,658 A | * | 5/1986 | Bauer | H02G 3/065 174/661 |
| 4,940,419 A | * | 7/1990 | Kurita | H01R 13/5213 439/271 |
| 5,822,189 A | * | 10/1998 | Isshiki | H01R 9/2425 361/736 |

(Continued)

FOREIGN PATENT DOCUMENTS

| | | | | |
|---|---|---|---|---|
| CN | 101494363 A | * | 7/2009 | ......... B60R 16/0238 |
| EP | 2405548 A2 | * | 1/2012 | ............. H02G 3/088 |

(Continued)

OTHER PUBLICATIONS

JP2013034282_English_Translation. Takeuchi Kunihiko. Feb. 2013. JPO. (Year: 2013).*
WO2009107749_english_translation.Kamenoue. WIPO (Year: 2009).*

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

An electrical junction box is provided in which a wire that is drawn from a lower surface of an upper electric component block is accommodated with an excess length in an extensible tube capable of being extended and contracted in the length direction of the wire. In the extended state of the extensible tube, the upper electric component block can be separated from an upper surface of the lower electric component block by extending the excess length of the wire in (Continued)

the extensible tube. In the contracted state of the extensible tube, the extensible tube is accommodated between the upper electric component block and the lower electric component block in a state in which the wire meanders in the extensible tube and the excess length is absorbed.

17 Claims, 6 Drawing Sheets

(56) References Cited

U.S. PATENT DOCUMENTS

| | | | | |
|---|---|---|---|---|
| 5,831,213 | A * | 11/1998 | Wright | H02G 3/18 174/64 |
| 6,027,360 | A * | 2/2000 | Jenkins | H01R 13/6215 439/248 |
| 6,108,202 | A * | 8/2000 | Sumida | H05K 7/026 361/690 |
| 6,121,548 | A * | 9/2000 | Matsuoka | B60R 16/0239 174/59 |
| 6,176,735 | B1 * | 1/2001 | Kawaguchi | B60R 16/0238 439/298 |
| 6,664,472 | B2 * | 12/2003 | Saneto | H02G 3/081 174/66 |
| 6,822,163 | B2 * | 11/2004 | Saneto | H02G 3/086 174/50 |
| 6,838,616 | B2 * | 1/2005 | Harrison | H02B 1/44 174/50 |
| 7,566,829 | B2 * | 7/2009 | Nakayama | B60R 16/0239 174/50 |
| 8,907,215 | B2 * | 12/2014 | Sakai | H02G 3/0691 174/61 |
| 9,124,079 | B2 * | 9/2015 | Takeuchi | H02B 1/052 |
| 9,966,748 | B1 * | 5/2018 | Eom | H02G 3/086 |
| 10,069,287 | B2 * | 9/2018 | Zamora Gil | F16B 2/22 |
| 10,304,606 | B2 * | 5/2019 | Aichi | H01F 27/06 |
| 10,554,031 | B1 * | 2/2020 | Foote | H02G 3/16 |
| 10,893,611 | B2 * | 1/2021 | Tsuchida | H05K 1/0203 |
| 2001/0022301 | A1 * | 9/2001 | O'Donnell | H02G 3/08 220/3.92 |
| 2008/0293269 | A1 * | 11/2008 | Kurizono | H01R 13/567 439/76.2 |
| 2009/0280661 | A1 * | 11/2009 | Akahori | H01R 9/223 439/76.2 |
| 2010/0133265 | A1 * | 6/2010 | Kita | H02G 3/08 220/3.9 |
| 2010/0270051 | A1 * | 10/2010 | Mizukami | B60R 16/0239 174/50 |
| 2011/0183537 | A1 * | 7/2011 | Fornage | H01R 43/26 439/271 |
| 2012/0043104 | A1 * | 2/2012 | Takeuchi | H02B 1/052 174/50 |
| 2012/0268907 | A1 * | 10/2012 | Sakai | H01R 13/055 361/775 |
| 2013/0280928 | A1 * | 10/2013 | Schweitzer | H01R 9/226 439/76.2 |
| 2013/0280952 | A1 * | 10/2013 | Saimoto | H01R 13/42 439/527 |
| 2014/0131089 | A1 * | 5/2014 | Tashiro | H02G 3/08 174/535 |
| 2015/0047870 | A1 * | 2/2015 | Tanaka | H02G 3/16 174/60 |
| 2015/0092384 | A1 * | 4/2015 | Miyazaki | H02G 3/16 361/807 |
| 2015/0236489 | A1 * | 8/2015 | Yamamoto | H01R 4/22 174/520 |
| 2016/0020049 | A1 * | 1/2016 | Kawamura | H01R 13/73 200/51 R |
| 2016/0164265 | A1 * | 6/2016 | Kawamura | H02G 3/086 361/622 |
| 2016/0372904 | A1 * | 12/2016 | Nakayama | H01R 13/5833 |
| 2018/0034169 | A1 * | 2/2018 | Haraguchi | B60R 16/0238 |
| 2018/0065576 | A1 * | 3/2018 | Kawaguchi | H02G 3/088 |
| 2018/0154846 | A1 * | 6/2018 | Kiyosue | H02G 3/16 |
| 2018/0263128 | A1 * | 9/2018 | Nakano | B60R 16/0207 |
| 2019/0132966 | A1 * | 5/2019 | Mitsui | H05K 5/0069 |
| 2019/0181584 | A1 * | 6/2019 | Yamashita | B60R 16/03 |
| 2019/0273372 | A1 * | 9/2019 | Hikosaka | B60R 16/0239 |
| 2019/0356067 | A1 * | 11/2019 | Honma | H01R 29/00 |
| 2020/0068732 | A1 * | 2/2020 | Tashiro | H05K 7/026 |
| 2020/0176894 | A1 * | 6/2020 | Tomita | B60R 16/0239 |
| 2020/0295553 | A1 * | 9/2020 | Kurata | H02G 3/10 |
| 2020/0335956 | A1 * | 10/2020 | Miyamoto | B60R 16/0238 |
| 2020/0412030 | A1 * | 12/2020 | Carnick | B60R 16/0239 |
| 2021/0101545 | A1 * | 4/2021 | Kurata | H02G 3/14 |
| 2021/0104880 | A1 * | 4/2021 | Kurata | H02G 3/081 |
| 2021/0197742 | A1 * | 7/2021 | Aruga | B60R 16/0207 |

FOREIGN PATENT DOCUMENTS

| | | | | |
|---|---|---|---|---|
| JP | 5800628 | | 9/2015 | |
| WO | WO-2009107749 | A1 * | 9/2009 | ........ B60R 16/0215 |
| WO | WO-2011065461 | A * | 6/2011 | ........ B60R 16/0238 |
| WO | WO-2017221648 | A1 * | 12/2017 | ............ H01R 9/18 |
| WO | WO-2019139042 | A1 * | 7/2019 | ............ H02G 3/081 |

* cited by examiner

Fig. 7
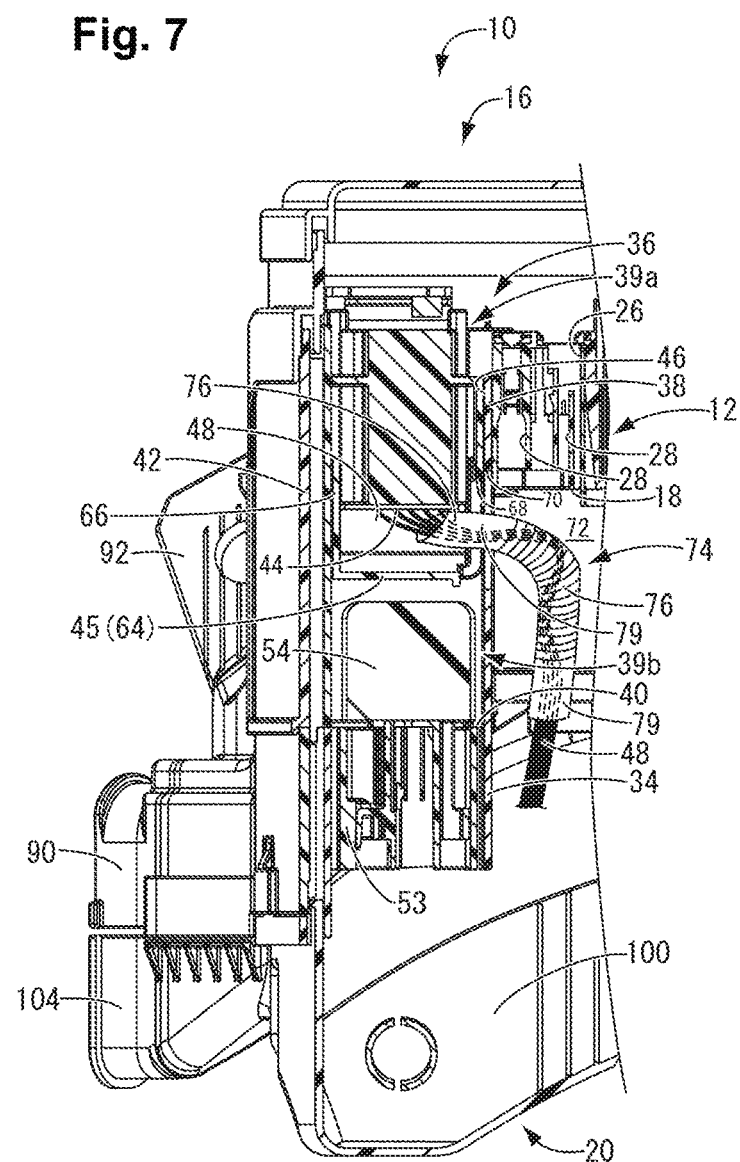
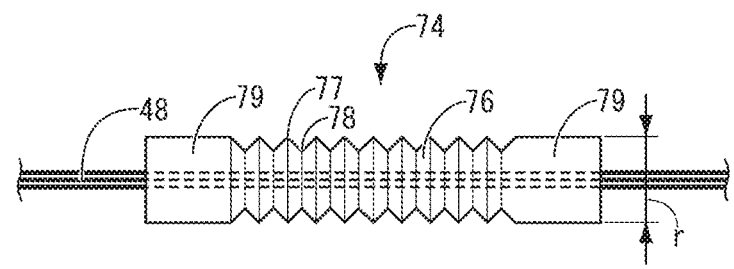
Fig. 8A
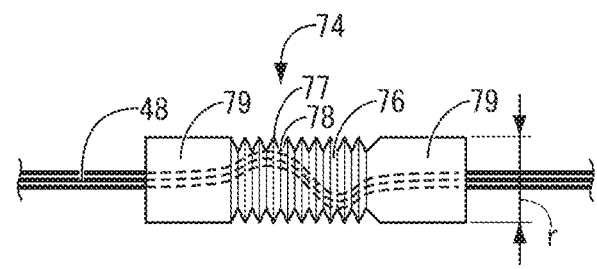
Fig. 8B

SPACE-EFFICIENT ELECTRICAL JUNCTION BOX FOR VEHICLES

TECHNICAL FIELD

The present invention relates to an electrical junction box that is installed in an engine room of an automobile or the like.

BACKGROUND ART

Conventionally, various types of electric components such as a relay and a fuse are accommodated in the box body of an electrical junction box installed in an automobile engine room or the like, and thus efficient distribution of the power supply, for example, is achieved. In particular, with an increase in the number of electric/electronic components and the need for increased compactness of vehicles in recent years, an electrical junction box such as that described in JP 5800628A has been proposed in which electric component blocks, such as relay blocks, in two upper and lower stages are attached to the box body. This can enhance the space efficiency of the electrical junction box, thus making it possible to accommodate and hold a larger number of electric components in the box body.

Meanwhile, a structure in which the electric component blocks are attached in two upper and lower stages in this manner has the problem that wires extending out from the upper electric component block or the lower surface of the upper electric component block impede the attachment of the electric components to the lower electric component block, resulting in poor mounting operability. Therefore, JP 5800628A proposes a structure in which a connector is provided at an end of each wire extending out from the lower surface of the upper electric component block, and the connector is connected to a connector connection portion provided on the lower electric component block. This allows the upper electric component block to be separated to another location when attaching an electric component to the lower electric component block, thus improving the mounting operability.

However, the structure described in JP 5800628A requires the provision of the connector attachment portion on the lower electric component block, thus posing the problem that the electric component attachment space of the lower electric component block is reduced due to the provision of the connector attachment portion, or that the size of the electric component block itself increases due to the provision of the connector attachment portion. In addition, it also becomes necessary to separately provide a connector to the wire extending out from the lower surface of the upper electric component block, and, therefore, there will be an inevitable increase in costs, and, depending on the type of the wire, many connectors may need to be attached separately. In that case, a plurality of connectors extending from the upper electric component block need to be respectively attached to a plurality of connector connection portions provided on the lower electric component block, which may reduce the mounting operability on the contrary.

Additionally, there is the possibility that the wires extending out from the upper electric component block may interfere with electric components such as a fuse and a relay that are attached to the upper surface of the lower electric component block, or may be pinched between the two upper and lower electric component blocks.

JP 5800628A is an example of related art.

SUMMARY OF THE INVENTION

The present invention has been made in light of the above-described circumstances, and a problem to be solved by the invention is to provide an electrical junction box having a novel structure that, in an electrical junction box in which a plurality of electric component blocks are attached to a box body in multiple stages in the up-down direction, can improve, with a simple structure, the operability of mounting an electric component to the lower electric component block without affecting the structures of the existing upper and lower electric component blocks, and can advantageously prevent the interference between a wire extending out from the upper electric component block with an electric component attached to the lower electric component block.

A first aspect of the present invention is directed to an electrical junction box including: a box body; an electric component block attachment portion that is provided in the box body, is open upward in the box body, and extends in an up-down direction of the box body; and a plurality of electric component blocks in each of which an electric component is attached to a component attachment portion formed open in an upper surface thereof, the electric component blocks being attached to the electric component block attachment portion in multiple stages in the up-down direction, wherein a wire extending out from a lower surface of each of the upper electric component blocks is accommodated with an excess length in an extensible tube capable of being extended and contracted in a length direction of the wire, in an extended state of the extensible tube, the upper electric component block can be separated from the upper surface of the lower electric component block by extending the excess length of the wire in the extensible tube, and, in a contracted state of the extensible tube, the wire is held in the extensible tube and in a state in which the wire meanders and the excess length is absorbed, and the extensible tube is accommodated between the upper electric component block and the lower electric component block.

According to the present aspect, the wire that is drawn from the lower surface of the upper electric component block is accommodated with an excess length in the extensible tube capable of being extended and contracted in the length direction of the wire. Accordingly, in the extended state of the extensible tube, the excess length is extended in the extensible tube, thus allowing the upper electric component block to be separated from the upper surface of the lower electric component block by the excess length. This allows easy access to the upper surface of the lower electric component block, thus making it possible to improve the operability of mounting an electric component. In the contracted state of the extensible tube, the wire meanders in the extensible tube, and thus the wire is accommodated and held in the extensible tube in a state in which the excess length is absorbed. Accordingly, the wire with an excess length can be accommodated between the upper electric component block and the lower electric component block in a compact manner, and it is thus possible to prevent the occurrence of problems such as the wire interfering with the electric component attached to the upper surface of the lower electric component block, and that the wire being pinched between the two upper and lower electric component blocks. Therefore, with a simple structure in which a wire that is drawn from the upper electric component block has an excess length, and the wire is accommodated in the extensible tube, it is possible to achieve both the improvement of the mounting operability for the electric component blocks mounted in multiple stages in the up-down direction and the prevention of interference of the wire, without affecting the structures of the electric component blocks. Accordingly, the problems relating to an electrical junction box including electric component blocks mounted in multiple stages in the up-down direction have been solved with a higher degree of design freedom and higher versatility as compared with the structure described in JP 5800628A.

Note that an extensible tube capable of being extended and contracted in the length direction of the wire can be used as the extensible tube, and the extensible tube can be formed, for example, by a bellows-shaped tube made of a synthetic resin, or a tube made of an elastic material such as an elastomer.

A second aspect of the present invention is directed to the electrical junction box according to the first aspect, wherein the extensible tube includes an extensible portion having a bellows structure that has a constant radius and is capable of being extended and contracted in an axial direction thereof.

According to the present aspect, the extensible tube includes an extensible portion having a bellows structure that has a constant radius and is capable of being extended and contracted in the axial direction, and the radius dimension of the extensible tube does not change due to the extension/contraction of the extensible tube, and it is thus possible to prevent the radius of the extensible tube in the contracted state from increasing. The extensible tube can be accommodated and held between the upper and lower electric component blocks, and the gap dimension between the upper and lower electric component blocks can be decreased, thus making it also possible to contribute to the size reduction of the electrical junction box.

A third aspect of the present invention is directed to the electrical junction box according to the first or second aspect, wherein the box body is provided with a temporary holding projection for temporarily holding the upper electric component block at a position separated from the upper surface of the lower electric component block, and the upper electric component block is provided with an engaging portion that engages with the temporary holding projection.

According to the present aspect, the upper electric component block can be temporarily held at a position separated from the upper surface of the lower electric component block by the temporary holding projection and the engaging portion, thus making it possible to further facilitate mounting an electric component to the lower electric component block.

Note that the temporary holding projection may be provided as a dedicated projection protruding from the electrical junction box, or may be provided using the existing wall portion, projection, and the like without providing any additional component.

A fourth aspect of the present invention is directed to the electrical junction box according to the third aspect, wherein the electric component block attachment portion is defined by a surrounding wall of the box body, a pair of side walls that protrude inward of the box body from the surrounding wall so as to be separated from and parallel to each other, and a back wall that couples protruding end edge portions of the pair of side walls, the temporary holding projection is provided protruding from a position located further inward of the box body than the back wall is, and the wire passing through a wire insertion hole that is formed open in the back wall and extending out from the lower surface of the upper electric component block extends to an interior of the box body.

According to the present aspect, the electric component block attachment portion is defined by a surrounding wall of the box body, a pair of side walls that protrude therefrom inward of the box body so as to be separated from and parallel to each other, and a back wall that couples protruding end edge portions of the pair of side walls, and the wire extending out from the lower surface of the upper electric component block extends to the interior of the box body through a wire insertion hole that is formed open in the back wall. This allows the wire extending from the lower surface of the upper electric component block to extend concentratedly to the back wall portion of the electric component block attachment portion, and it is therefore possible to restrict the extending path of the wire, thus minimizing the risk of interference between the wire and an electric component and the like that is attached to the lower electric component block, and the pinching of the wire between the upper and lower electric component blocks.

Moreover, since the temporary holding projection is provided protruding from a position located inward of the box body that is further separated from the electric component block attachment portion than the back wall in which the wire insertion hole is provided, the adverse effect of the wire exerted during the operation of attaching an electric component to the lower electric component block is reduced as much as possible.

A fifth aspect of the present invention is directed to the electrical junction box according to the fourth aspect, wherein the surrounding wall of the box body that defines the electric component block attachment portion is provided with a cut-out portion that extends across the pair of side walls and that is cut out in a depth extending to the upper surface of the lower electric component block, and the cut-out portion is configured to be covered by a removable lid.

According to the present aspect, the surrounding wall of the box body that defines the electric component block attachment portion is provided with a cut-out portion that extends across the pair of side walls and that is cut out in a depth extending to the upper surface of the lower electric component block, and also the cut-out portion is to be covered by a removable lid. Accordingly, when attaching an electric component to the component attachment portion of the lower electric component block, access can be made possible to the component attachment portion of the lower electric component block, not only from above, but also from the side, by removing the lid to expose the cut-out portion, and it is therefore possible to further improve the mounting operability of an electric component to the lower electric component block.

A sixth aspect of the present invention is directed to the electrical junction box according to any one of the first to fifth aspects, wherein a slidable coupling mechanism extending in the up-down direction is provided between the electric component block attachment portion and the upper electric component block, and the upper electric component block is configured to be slidably attached to the electric component block attachment portion from above by the slidable coupling mechanism.

According to the present aspect, the upper electric component block is configured to be slidably attached to the electric component block attachment portion from above by the slidable coupling mechanism. Therefore, after the electric component has been mounted to the lower electric component block, the upper electric component block can be quickly and easily attached to the electric component block attachment portion. Moreover, to remove the upper electric component block from the electric component block attachment portion, the upper electric component block may simply be pulled upward, and it is therefore possible to easily perform the maintenance of, or replace, the electric component attached to the lower electric component block.

A seventh aspect according to the present invention is directed to the electrical junction box according to any one of the first to sixth aspects, wherein the upper electric component block can be separated to a position that does not overlap in the up-down direction with the component attachment portion formed open in the upper surface of the lower electric component block.

According to the present aspect, the excess length of the wire is set such that the upper electric component block can be separated to a position that does not overlap in the up-down direction with the component attachment portion in the upper surface of the lower electric component block. Accordingly, mounting an electric component to the component attachment portion of the lower electric component block can be further reliably facilitated, thus making it possible to reliably improve the mounting operability.

According to the present invention, the wire that is drawn from the lower surface of the upper electric component block is accommodated with an excess length in the extensible tube capable of being extended and contracted in the length direction of the wire. Accordingly, in the extended state of the extensible tube, the upper electric component block can be separated from the upper surface of the lower electric component block by the excess length. This allows an easy access to the upper surface of the lower electric component block, thus making it possible to improve the operability of mounting an electric component. In the contracted state of the extensible tube, the wire is accommodated and held in the extensible tube in a state in which the excess length is absorbed. This allows the wire with an excess length to be accommodated in a compact manner between the upper electric component block and the lower electric component block, thus preventing problems such as the wire interfering with the electric component attached to the upper surface of the lower electric component block, and the wire being pinched between the two upper and lower electric component blocks. With this simple structure, it is possible to achieve both the improvement of the operability of mounting electric component blocks mounted in multiple stages in the up-down direction and the prevention of interference of the wire, without affecting the structures of the electric component blocks. Accordingly, the problems relating to an electrical junction box including electric component blocks mounted in multiple stages in the up-down direction have been solved with a high degree of design freedom and high versatility.

BRIEF DESCRIPTION OF THE DRAWINGS

FIG. 7 is an enlarged cross-sectional view taken along the line VII-VII in FIG. 6;

FIG. 8A is a plan view of the extensible tube shown in FIG. 1 (when extended); and FIG. 8B is a plan view of the extensible tube shown in FIG. 1 (when contracted).

EMBODIMENTS OF THE INVENTION

Hereinafter, an embodiment of the present invention will be described with reference to the drawings.

Figure 1:
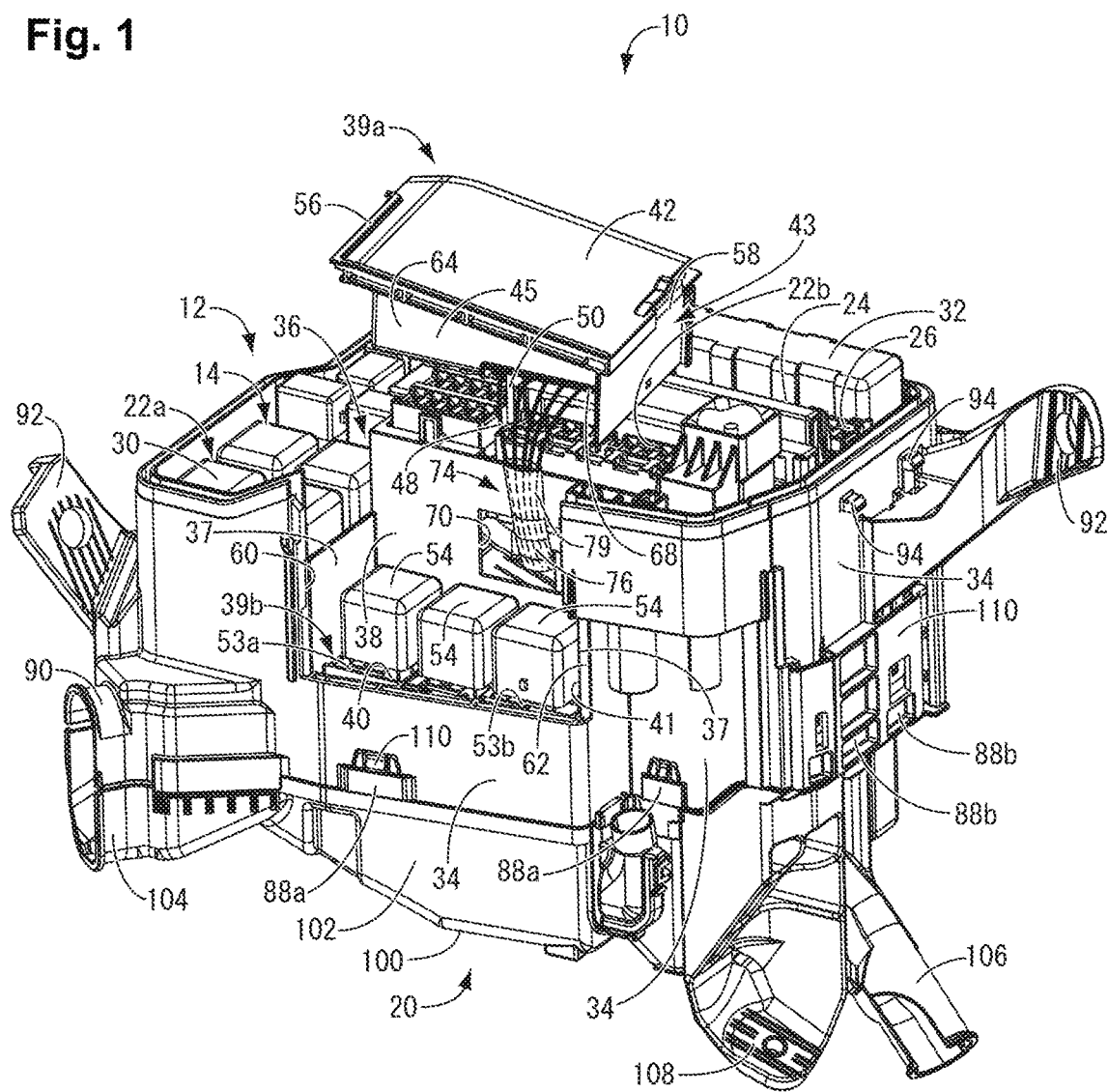
FIG. 1 is a perspective view showing an electrical junction box according to an embodiment of the present invention (before an upper electric component block is attached)

FIGS. 1 to 7 show an electrical junction box 10 according to an embodiment of the present invention. As shown in FIG. 1, the electrical junction box 10 includes a box body 12, an upper case 16 (see FIGS. 4 and 6) that covers an upper surface 14 of the box body 12, and a lower case 20 that covers a lower surface 18 (see FIG. 7) of the box body 12. In the following description, the upper side refers to the upper side in FIGS. 1, 3, 4 and 7, the lower side refers to the lower side in FIGS. 1, 3, 4 and 7, the front refers to the left in FIGS. 4 and 6, and the rear refers to the right in FIGS. 4 and 6. Additionally, the length direction refers to the left-right direction in FIGS. 4 and 6, and the width direction refers to the up-down direction in FIG. 6.

The box body 12 has the overall shape of an elongated rectangular block, and is formed as a single piece through injection molding or the like using an insulating synthetic resin such as polypropylene (PP) or polyamide (PA). As shown in FIG. 1, relay attachment portions 22a and 22b, a fusible link attachment portion 24, and a fuse attachment portion 26 are formed open upward in the upper surface 14 of the box body 12. As partly shown on the upper right in FIG. 7, a plurality of terminal accommodating holes 28 are formed open downward in the lower surface 18 of the box body 12. Although not shown, crimped terminals or the like that are crimped to ends of wires serving as conductive members are accommodated in the terminal accommodating holes 28, and a busbar or the like serving as a conductive member forming an electric circuit is attached and supported in a busbar accommodating groove (not shown) or the like.

Also, as shown in FIG. 1, relays 30, a fusible link 32, and a fuse (not shown) are attached to the relay attachment portion 22a, the fusible link attachment portion 24, and the fuse attachment portion 26, respectively, from the upper surface 14 side of the box body 12. Consequently, tab terminals (not shown) protruding from the relays 30, the fusible link 32, and the fuse are conductively connected to the crimped terminals at the ends of the wires, the busbar and the like.

Figure 2:
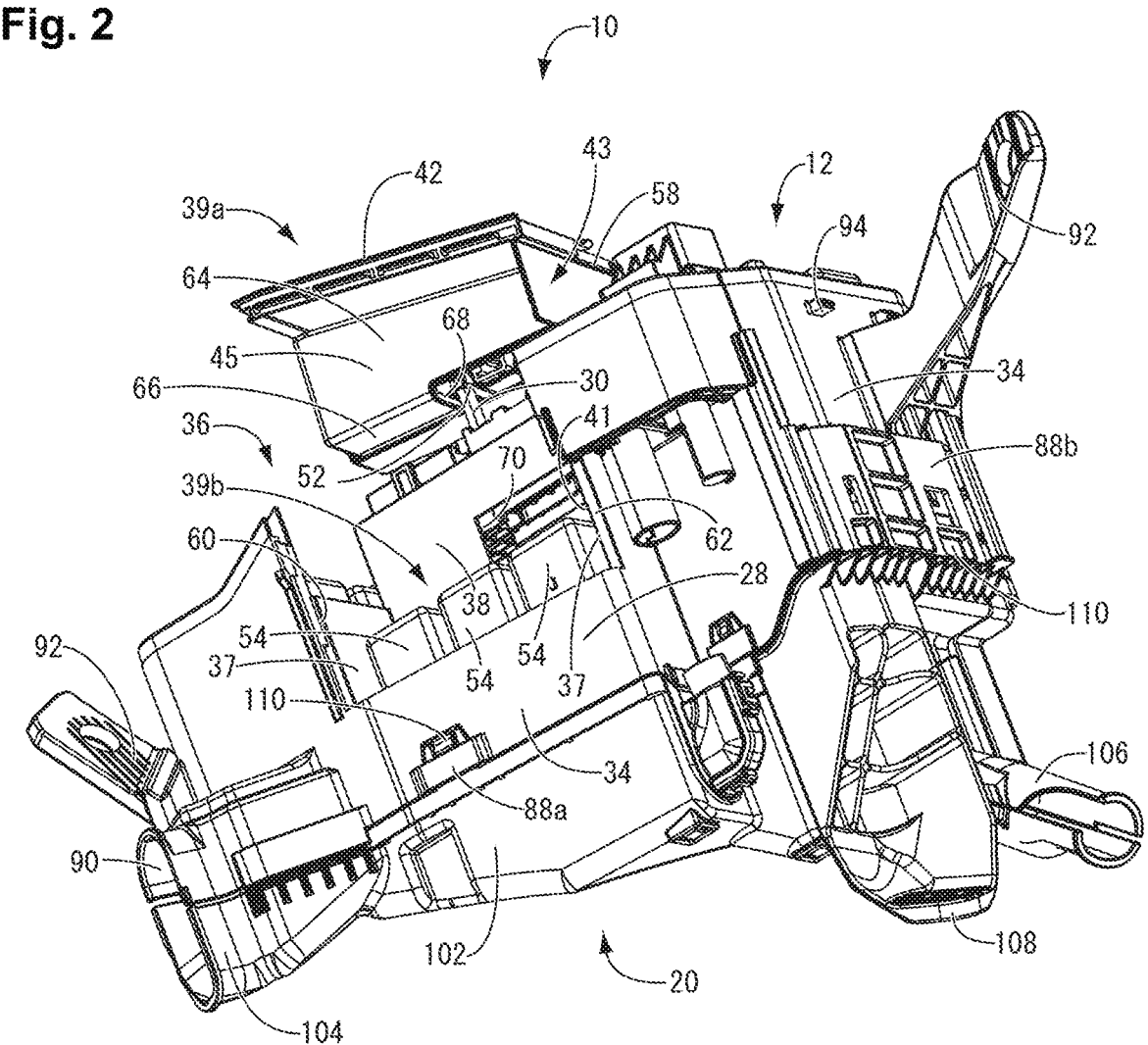
FIG. 2 is a perspective view of the electrical junction box shown in FIG. 1 as viewed from obliquely below at the back.
Figure 3:
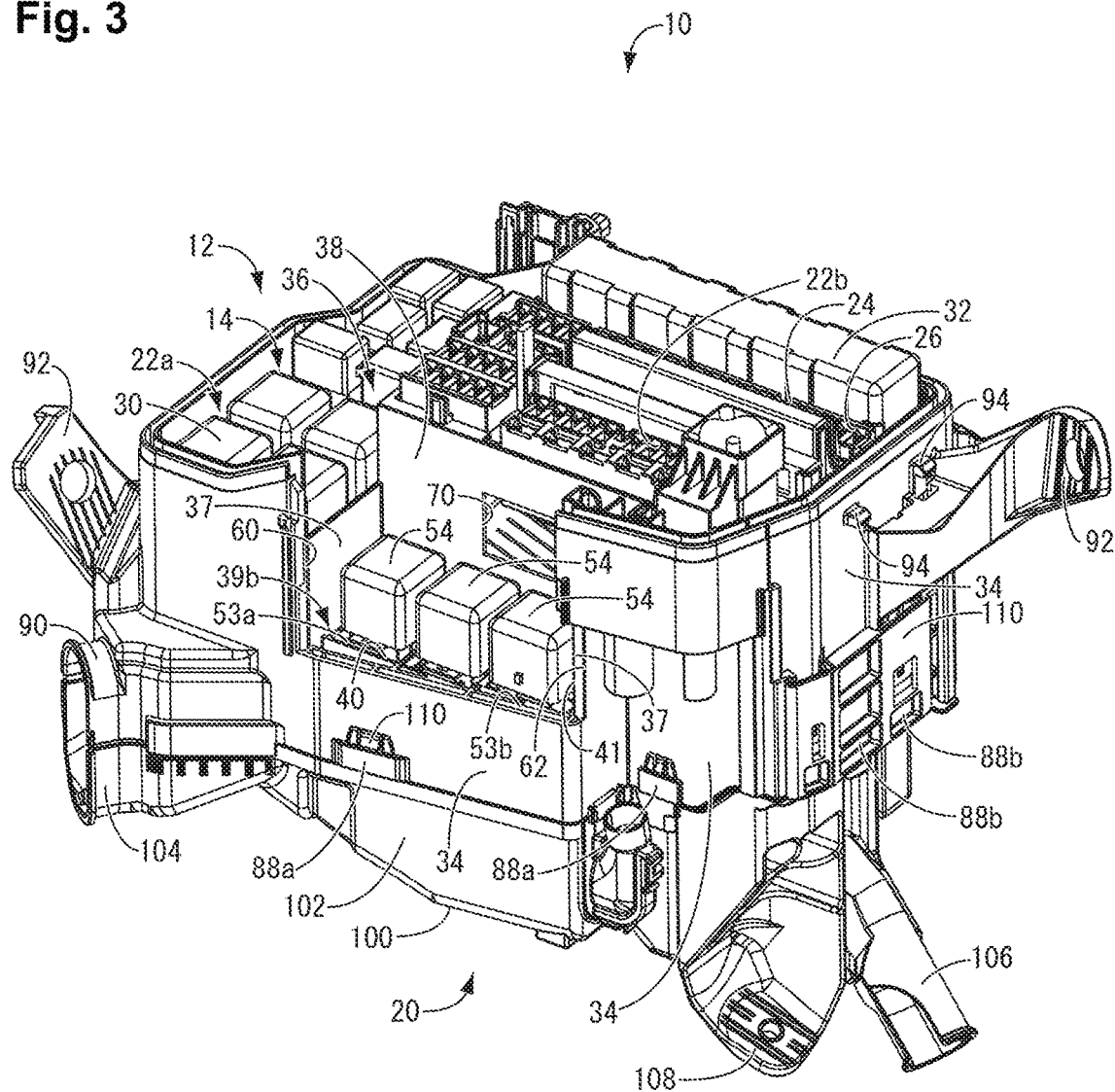
FIG. 3 is a perspective view of the electrical junction box shown in FIG. 1 in a state in which the upper electric component block has been removed therefrom.

As shown in FIGS. 1 to 3, the box body 12 has a substantially rectangular flame-shaped surrounding wall 34 extending continuously from the outer circumferential edge portion around the entire circumference of the box body 12, and an electric component block attachment portion 36 is provided including a portion of the region of the surrounding wall 34. More specifically, the electric component block attachment portion 36 is defined by the surrounding wall 34 (the front side in FIG. 1) of the box body 12, a pair of side walls 37 and 37 that protrude in parallel, inward (obliquely upward in FIG. 1) from the surrounding wall 34 toward the box body 12, and that are separated from each other toward the circumferential direction (the left-right direction in FIG. 1) of the surrounding wall 34, and a back wall 38 that couples protruding end edge portions of the pair of side walls 37 and 37. The electric component block attachment portion 36 is open in the up-down direction of the box body 12, extends over substantially the entire length in the up-down direction, and has the overall shape of a substantially rectangular frame. As shown in FIGS. 1 and 7, an electric component block 39a is attached on the upper side, and an electric component block 39b is attached on the lower side, relative to the electric component block attachment portion 36. The upper electric component block 39a has the overall shape of a substantially rectangular block, and is configured to be accommodated and held on the upper side of the electric component block attachment portion 36 by being fitted from above. In addition, the surrounding wall 34 of the box body 12 that defines the electric component block attachment portion 36 is provided with a cut-out portion 41 that extends across the pair of side walls 37 and 37 and that is cut in a depth extending to an upper surface 40 of the lower electric component block 39b, and the cut-out portion 41 is configured to be covered by a removable lid 42. In the present embodiment, the lid 42 is provided as a single piece with the upper electric component block 39a (see FIGS. 1 and 7).

Figure 5:
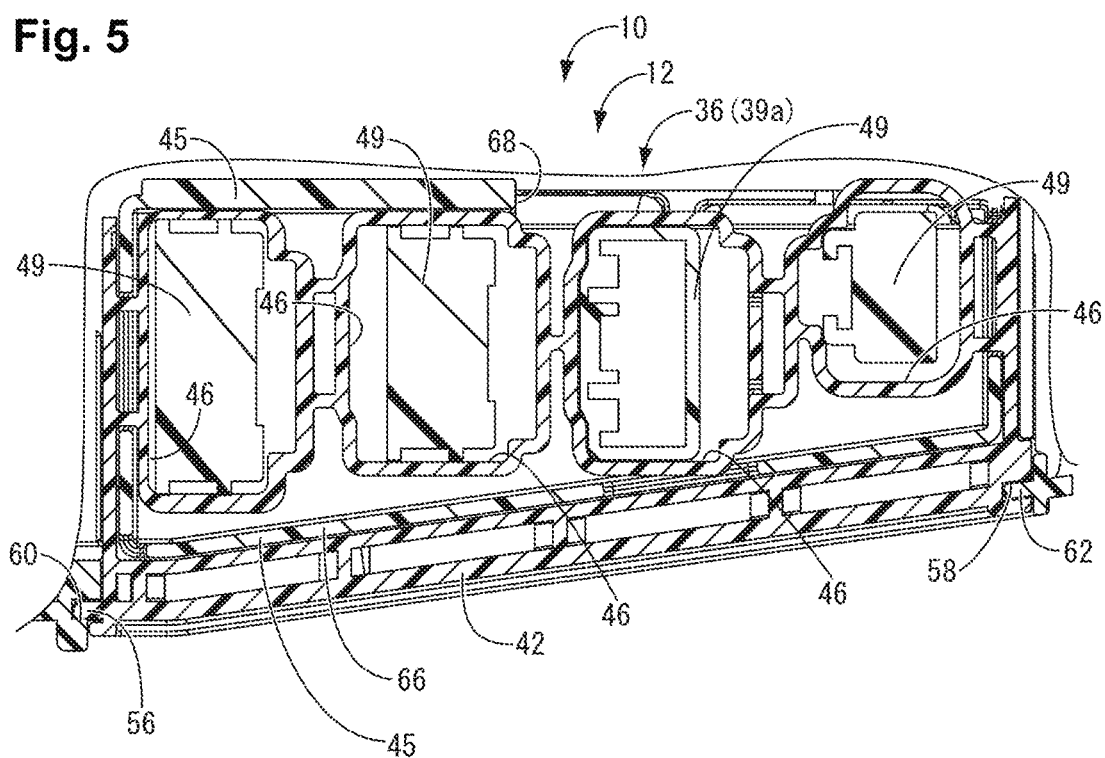
FIG. 5 is an enlarged cross-sectional view taken along the line V-V in FIG. 4.

More specifically, as shown in FIGS. 1 to 2 and 5, the upper electric component block 39a includes a rectangular frame-shaped block body 43, and a cover portion 45 that covers a lower surface 44 of the block body 43 from the lower side. Furthermore, as shown in FIG. 5, four substantially rectangular box-shaped connector attachment portions 46 serving as component attachment portions that are open upward are formed on the upper surface of the block body 43, and many terminal accommodating holes (not shown) are formed open downward in the lower surface 44 (see FIG. 7) of the block body 43. Then, crimped terminals (not shown) or the like that are crimped to the ends of wires 48 are accommodated and held in the terminal accommodating holes, whereas connectors 49 serving as electric components are accommodated in the connector attachment portions 46 (see FIG. 5), and the crimped terminals (not shown) of the like provided at the ends of the wires 48 are connected to tab terminals (not shown). Note that the connectors 49 are prevented from coming out by abutment against the upper case 16, for example.

Next, a temporary holding mechanism and a slidable coupling mechanism that are used when mounting the upper electric component block 39a described above to the electric component block attachment portion 36 will be described with reference to FIGS. 1 to 3 and 5. First, the temporary holding mechanism for holding the upper electric component block 39a at a position separated from the upper surface 40 of the lower electric component block 39b in a temporarily held state is composed of a substantially rectangular plate-shaped temporary holding projection 50 provided protruding from the upper surface 14 of the box body 12, and a recessed engaging portion 52 that is provided in the block body 43 of the upper electric component block 39a, is open outward (downward in FIG. 2), and is engaged with the protruding distal end portion of the temporary holding projection 50. More specifically, the temporary holding projection 50 is provided protruding from a position of the upper surface 14 that is located further inward (upward in FIG. 6) of the box body 12 than the back wall 38 of the electric component block attachment portion 36 is. Thus, the upper electric component block 39a can be separated to a position that does not overlap in the up-down direction with the relay attachment portions 53 serving as the component attachment portions that are formed open in the upper surface 40 of the lower electric component block 39b. This further facilitates the mounting of relays 54 to the relay attachment portions 53 of the lower electric component block 39b, thus making it possible to reliably enhance the mounting operability.

Meanwhile, as shown in FIGS. 1 to 5, the slidable coupling mechanism is composed of: a ridge 56 that is formed at the front end portion of the lid 42 is provided as a single piece with the upper electric component block 39a, and extends in the up-down direction with a substantially rectangular cross section; a recessed groove 58 that is formed in the rear end portion of the lid 42, and extends in the up-down direction with a substantially rectangular cross section; and a recessed groove 60 and a ridge 62 that are provided on the electric component block attachment portion 36 at the positions respectively corresponding to the ridge 56 and the recessed groove 58. Thus, the slidable coupling mechanism extending in the up-down direction is provided between the electric component block attachment portion 36 and the upper electric component block 39a, and the slidable coupling mechanism allows the upper electric component block 39a to be slidably attached to the electric component block attachment portion 36 from above. Therefore, after the relays 54 are mounted to the lower electric component block 39b, the upper electric component block 39a can be quickly and easily attached to the electric component block attachment portion 36. Moreover, to remove the upper electric component block 39a from the electric component block attachment portion 36, the upper electric component block 39a may be simply pulled upward, and it is therefore possible to easily perform the maintenance of, or replace, the relays 54 attached to the lower electric component block 39b.

As shown in FIGS. 1 to 2 and 7, the cover portion 45 of the block body 43 of the upper electric component block 39a has the overall shape of a substantially rectangular box, and the upper electric component block 39a has a substantially rectangular plate-shaped bottom wall 64, and a surrounding wall 66 protruding upward from the outer circumferential edge portion of the bottom wall 64 around substantially the entire circumference. A wire outlet port 68 is formed by cutting out a rear lower end portion of the back side (the lower side in FIG. 2) of the surrounding wall 66, and the wire outlet port 68 is open on the outer circumferential side (the right side in FIG. 7) relative to the peripheral edge portion of the lower electric component block 39b. Furthermore, as shown in FIG. 7, the wires 48 extending out from the lower surface 44 of the upper electric component block 39a pass through the wire outlet port 68 and a wire insertion hole 70 formed open in the back wall 38 of the electric component block attachment portion 36 opposed to the wire outlet port 68, and extend to an interior 72 of the box body 12. Here, the wires 48 are accommodated in an extensible tube 74. More specifically, as shown in FIGS. 8A and 8B, the extensible tube 74 has a constant radius dimension: r, and is capable of being extended and contracted in the axial direction by including an extensible portion 76 having a bellows structure at its central portion in the axial direction. For example, the extensible tube 74 is formed of a dispersion obtained by mixing an ethylene-propylene rubber (EPDM) with polypropylene (PP) as a thermoplastic resin. The extensible portion 76 of the extensible tube 74 has a structure in which a ridge 77 extending in an annular shape with a substantially inverted-V-shaped cross section in the circumferential direction on the outer circumferential side, and a trough 78 extending in an annular shape with a substantially V-shaped cross section in the circumferential direction on the outer circumferential side are alternately connected in the axial direction. Furthermore, opposite end portions of the extensible tube 74 in the axial direction are formed as fixed portions 79, which are bound and fixed to the wire 48 with a binding tape (not shown) or the like. Note that the extensible tube 74 is omitted in FIG. 2 to facilitate understanding.

Meanwhile, as shown in FIG. 1, the lower electric component block 39*b* has the shape of a substantially rectangular frame that is open in the up-down direction, and substantially rectangular block-shaped relay attachment portions 53 serving as component attachment portions are accommodated and held in the lower electric component block 39*b* by being fitted from the lower side thereof. The relay attachment portions 53 of the lower electric component block 39*b* are formed open in the upper surface 40, and the relays 54 are attached thereto from the upper side.

Figure 6:
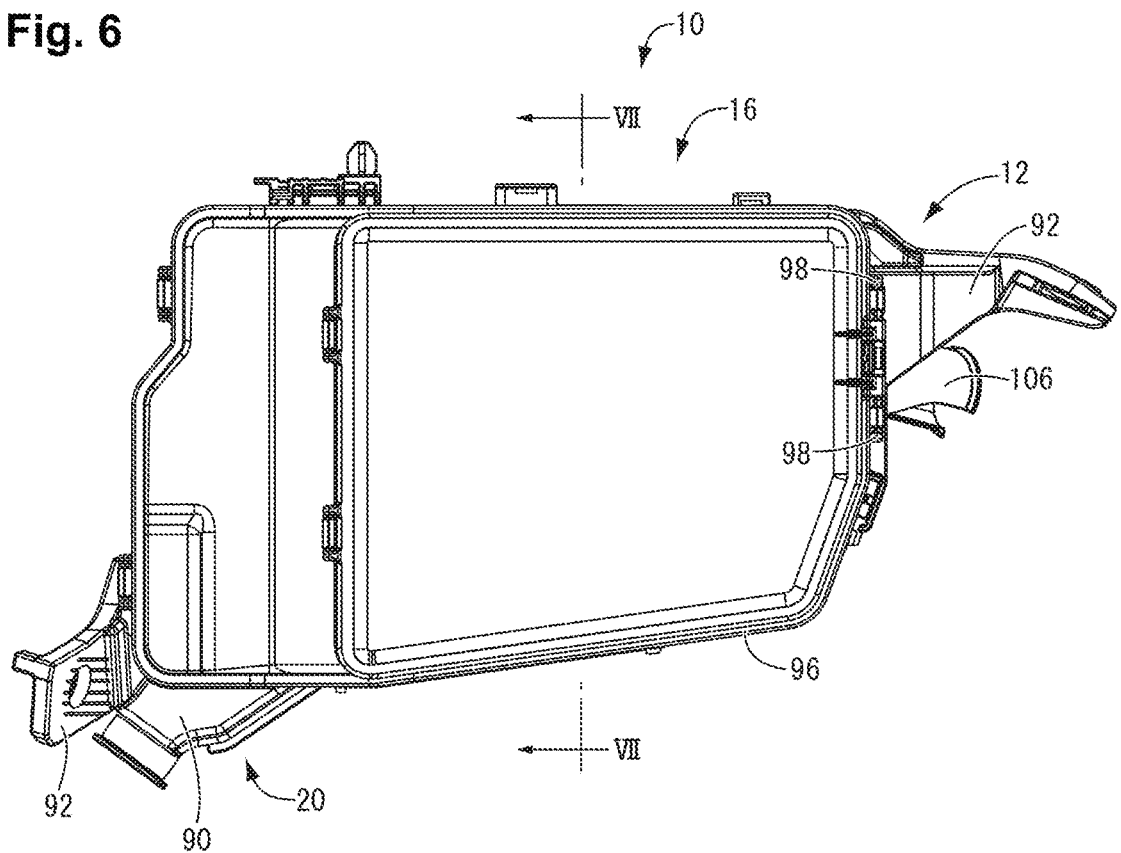
FIG. 6 is a plan view of the electrical junction box shown in FIG. 4.

As shown in FIGS. 1 to 4 and 6, substantially rectangular flame-shaped engaged portions 88*a* and 88*b* are provided at two locations separated in the length direction at the lower end portion on each surface of the surrounding wall 34 of the box body 12, and a substantially half-cylindrical wire outlet portion 90 extending outward and obliquely forward is provided at the front end portion of the lower end portion of the surrounding wall 34 (the lower side in FIG. 6). Furthermore, substantially plate-shaped attachment leg portions 92 extending outward and obliquely upward are provided at the lower end portions on the upper side at the back of the surrounding wall 34 (the right side in FIG. 6) and on the front side of the surrounding wall 34 (the left side in FIG. 6). In addition, a pair of projection-shaped engaging portions 94 and 94 that are separated in the circumferential direction protrude outward from the upper side of the attachment leg portion 92 of the surrounding wall 34 (the right side in FIG. 6).

Figure 4:
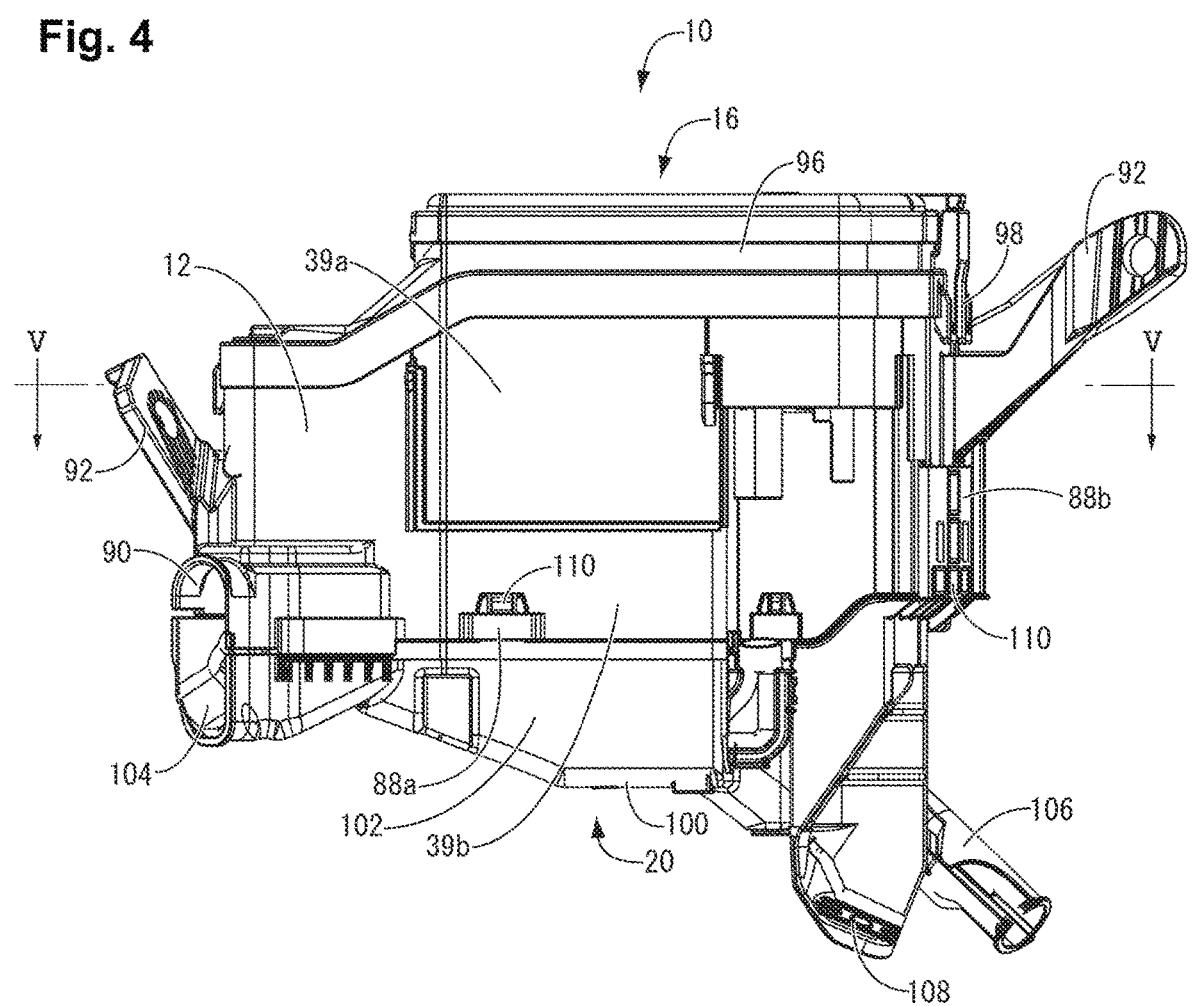
FIG. 4 is a front view of the electrical junction box shown in FIG. 1 in a state in which the upper electric component block and an upper case have been mounted thereto.

As shown in FIGS. 4, 6 and 7, the upper case 16 has the overall shape of a substantially rectangular box that is open downward, and is formed as a single piece, for example, by injection molding an insulating synthetic resin such as polypropylene (PP) or polyamide (PA). Frame-shaped engaged portions 98 are provided protruding downward from a surrounding wall 96 of the upper case 16 that is opposed in the front-rear direction (left-right direction in FIG. 6). As shown in FIGS. 4, 6 and 7, when mounting such an upper case 16 to the upward opening portion of the box body 12, the upper case 16 is inserted into the opening portion such that the inner circumferential surface of the surrounding wall 96 of the upper case 16 is placed on the outer circumferential surface of the upper end portion of the surrounding wall 34 of the box body 12. Then, by pushing the upper case 16 further toward the box body 12, the frame-shaped engaged portions 98 of the upper case 16 are engaged with the engaging portions 94 of the box body 12, and the upper case 16 is locked in the state of being attached to the upward opening portion of the box body 12, as shown in FIGS. 4, 6 and 7.

As shown in FIGS. 1 to 4 and 7, the lower case 20 has the shape of a bottomed box that is open upward, and is formed as a single piece through injection molding or the like using an insulating synthetic resin such as polypropylene (PP) or polyamide (PA). The lower case 20 is formed in the shape of an elongated rectangular shape that is substantially the same as the shape of the lower surface 18 of the box body 12 in plan view. More specifically, the lower case 20 has a substantially rectangular plate-shaped bottom wall 100, and a surrounding wall 102 provided protruding upward from the outer circumferential edge portion of the bottom wall 100 around substantially the entire periphery. A substantially half-cylindrical wire outlet portion 104 and a substantially cylindrical wire outlet portion 106 that extend outward and obliquely forward are provided at the front end portion of the lower end portion of the surrounding wall 102 (the lower side in FIG. 6) and the central portion in the circumferential direction of the surrounding wall 102 (the right side in FIG. 6), respectively. The upper surface of the bottom wall 100 of the lower case 20 is formed as an inclined surface that is inclined downward toward the wire outlet portions 104 and 106. At the front end portion of the lower end portion of the surrounding wall 102 (the right side in FIG. 6) and the central portion in the circumferential direction of the surrounding wall 102 (right side in FIG. 6), substantially plate-shaped attachment leg portions 108 extending forward and slightly downward are provided at the lower end portion, and engaging portions 110 are provided protruding upward from the upper end portion. Then, the engaging portions 110 are engaged with the engaged portions 88*a* and 88*b* of the box body 12, and the lower case 20 is fitted and held in the state of being attached to the downward opening portion of the box body 12.

In the following, a method for attaching electric components to the two upper and lower electric component blocks 39*a* and 39*b* accommodated in the electric component block attachment portion 36 of the electrical junction box 10 having such a structure will be described in detail. First, as shown in FIG. 1, when attaching the relays 54 serving as the electric components to the relay attachment portions 53 and 53 that are open in the upper surface 40 of the lower electric component block 39*b* attached to the electric component block attachment portion 36, the upper electric component block 39*a* is temporarily held at a predetermined position above the box body 12 that is displaced from the upper portion of the electric component block attachment portion 36 by the temporary holding mechanism composed of the recessed engaging portion 52 provided in the upper electric component block 39*a* and the temporary holding projection 50 provided protruding from the upper surface 14 of the box body 12. In this state, the extensible tube 74 is extended, and the excess length of the wire 48 is extended upward in the extensible tube 74, thus allowing the wires 48 drawn from the upper electric component block 39*a* and the electric component block 39*a* to be separated from the upper surface 40 of the lower electric component block 39*b* (see FIG. 1). In the present embodiment, the lid 42 that covers the cut-out portion 41 provided in the electric component block attachment portion 36 is provided as a single piece with the block body 43 of the upper electric component block 39*a*. Accordingly, in a state in which the upper electric component block 39*a* is temporarily held at the predetermined position above the box body 12 by the temporary holding mechanism, the relay attachment portions 53 of the lower electric component block 39*b* are widely open on the upper side and front side in FIG. 1, thus allowing an easy access to the relay attachment portions 53. Since the upper electric component block 39*a* is temporarily held at the predetermined position above the box body 12, the operator does not need to hold the upper electric component block 39*a*. Therefore, the operability of attaching the relays 54 to the relay attachment portions 53 of the lower electric component block 39*b* can be significantly improved.

Next, using the above-described slidable coupling mechanism, the upper electric component block 39*a* is mounted onto the lower electric component block 39*b*. In this state, as shown in FIG. 7, the extensible tube 74 is contracted, and the wires 48 are accommodated and held in the extensible tube 74 in a state in which the wires 48 meander and the excess length is absorbed. Accordingly, the wires 48 extending out from the lower surface 44 of the upper electric component block 39a with an excess length can be accommodated in the extensible tube 74 in the contracted state in a compact manner, and it is thus possible to accommodate the wires 48 between the upper electric component block 39a and the lower electric component block 39b in a state in which the wire 48 is accommodated in the extensible tube 74. Since the wires 48 that are drawn from the upper electric component block 39a are accommodated in the extensible tube 74, it is also possible to prevent the occurrence of problems such as the wires 48 interfering with the connectors 49 serving as the electric components that are attached to the upper surface 40 of the lower electric component block 39b, and the wires 48 being pinched between the two upper and lower electric component blocks 39a and 39b. In short, with a simple structure using such an extensible tube 74, it is possible to achieve both the improvement of the mounting operability for the electric component blocks 39a and 39b mounted in multiple stages in the up-down direction, and the prevention of interference of the wires 48, without affecting the structures of the electric component blocks 39a and 39b. With the electrical junction box 10 of the present embodiment, the above-described effects can be achieved with a higher degree of design freedom and higher versatility as compared with the conventional structure described in JP 5800628A. Finally, the connectors 49 are attached to the connector attachment portions 46 of the upper electric component block 39a from above, thus achieving the operation of attaching the electric components to the electric component blocks 39a and 39b that are arranged in multiple stages in the up-down direction with an excellent operability.

Here, the extensible tube 74 has a constant radius: r, and is capable of being extended and contracted in the axial direction by including the extensible portion 76 having a bellows structure at its central portion in the axial direction. That is, the radius: r of the extensible tube 74 does not change due to the extension/contraction of the extensible tube 74, and it is therefore possible to prevent the radius of the extensible tube 74 in the contracted state from increasing. Accordingly, the extensible tube 74 can be accommodated and held between the upper and lower electric component blocks 39a and 39b in a compact manner, and the gap dimension between the upper and lower electric component blocks 39a and 39b can be decreased, thus making it also possible to contribute to the size reduction of the electrical junction box 10.

In addition, with the temporary holding projection 50 and the engaging portion 52 that form the temporary holding mechanism, it is possible to stably hold the upper electric component block 39a in the temporarily held state at a predetermined position above the box body 12 that is displaced from the upper portion of the electric component block attachment portion 36. Accordingly, the operation of attaching the connectors 49 serving as the electric components to the lower electric component block 39b can be further facilitated. Moreover, the temporary holding projection 50 can be provided using the existing portions, including, for example, the wall portions of the relay attachment portions 22a and 22b, without providing any additional component.

The electric component block attachment portion 36 is defined by the surrounding wall 34, the pair of side walls 37 and 37, and the back wall 38 of the box body 12, and the wires 48 extending out from the lower surface 44 of the upper electric component block 39a extend to the interior 72 of the box body 12 through the wire insertion hole 70 of the back wall 38. This allows the wires 48 to extend concentratedly to the wire insertion hole 70 of the back wall 38 of the electric component block attachment portion 36, and it is therefore possible to restrict the extending path of the wires 48, thus minimizing the risk of interference between the wires 48 and the relays 54 or the like attached to the lower electric component block 39b. Furthermore, since the temporary holding projection 50 is provided protruding from a position located inward of the box body 12 that is further separated from the back wall 38 in which the wire insertion hole 70 is provided, the adverse effect of the wires 48 exerted during the operation of attaching the relays 54 to the lower electric component block 39b is reduced as much as possible.

Although an embodiment of the present invention has been described above, the invention is by no means intended to be limited by the specific description of the embodiment. For example, in the above embodiment, the cover portion 45 is provided between the lower surface 44 of the upper electric component block 39a and the upper surface 40 of the lower electric component block 39b; however, the cover portion 45 need not necessarily be provided. That is, the wires 48 extending out from the lower surface 44 of the upper electric component block 39a are covered by the extensible tube 74 even when the cover portion 45 is not provided. Accordingly, it is possible to prevent the occurrence of problems such as the wires 48 interfering with the connectors 49 attached to the upper surface 40 of the lower electric component block 39b, or the wires 48 being pinched between the two upper and lower electric component blocks 39a and 39b. Any material capable of being extended and contracted in the axial direction can be used as the material for forming the extensible tube 74, and the extensible tube 74 may be formed by a tube or the like that is made of a material other than those illustrated, including, for example, an elastic material such as an elastomer. As long as the extensible tube 74 is capable of being extended and contracted in the length direction of the wires 48, the extensible tube 74 is not limited to an extensible tube whose radius dimension is constant under extension/contraction as shown in the embodiment, and it is possible to use an extensible tube whose radius dimension is variable under extension/contraction.

Furthermore, in the above embodiment, the electric component blocks 39a and 39b attached in two stages in the up-down direction are described; however, they may be attached in three or more stages. In the case of electric component blocks attached in three or more stages, a structure for temporarily holding the electric component block may be provided on the surrounding wall of the box body, and the upper electric component block may be separated to a position that does not overlap with the upper surface of the lower electric component block in the up-down direction when attaching electric components to the component attachment portions of the lower electric component block, thus making the upper portion of the lower electric component block free. The temporary holding projection 50 may be provided as a dedicated temporary holding projection on the upper surface 14, the surrounding wall 34, or the like of the box body 12 of the electrical junction box 10, or may be provided using the existing wall portion, projection, and the like as described in the above embodiment, without providing any additional component.

LIST OF REFERENCE NUMERALS

10: Electrical junction box
12: Box body

34: Surrounding wall
36: Electric component block attachment portion
37: Side wall
38: Back wall
39a, 39b: Electric component block
40: Upper surface
41: Cut-out portion
42: Wall portion (lid)
44: Lower surface
46: Connector attachment portion (component attachment portion)
48: Wire
49: Connector (electric component)
50: Temporary holding projection
52: Engaging portion
56: Ridge (slidable coupling mechanism)
58: Recessed groove (slidable coupling mechanism)
60: Recessed groove (slidable coupling mechanism)
62: Ridge (slidable coupling mechanism)
70: Wire insertion hole
72: Interior
74: Extensible tube
76: Extensible portion
53: Relay attachment portion (component attachment portion)
54: Relay (electric component)

What is claimed is:

1. An electrical junction box comprising:
a box body; an electric component block attachment portion that is provided in the box body, is open upward in the box body, and extends in an up-down direction of the box body; and a plurality of electric component blocks in each of which an electric component is attached to a component attachment portion formed open in an upper surface thereof, the plurality of electric component blocks being attached to the electric component block attachment portion in multiple stages in the up-down direction,
wherein a wire extending out from a lower surface of each of upper electric component blocks is accommodated with an excess length in an extensible tube configured to be extended and contracted in a length direction of the wire,
in an extended condition of the extensible tube, the upper electric component block can be separated from the upper surface of a lower electric component block by extending the excess length of the wire in the extensible tube, and,
in a contracted condition of the extensible tube, the wire is held in the extensible tube in a condition in which the wire meanders and the excess length is absorbed, and the extensible tube is accommodated between the upper electric component block and the lower electric component block,
wherein the box body is provided with a temporary holding projection for temporarily holding the upper electric component block at a position separated from the upper surface of the lower electric component block, and the upper electric component block is provided with an engaging portion that engages with the temporary holding projection,
wherein the electric component block attachment portion is defined by a surrounding wall of the box body, a pair of side walls that protrude inward of the box body from the surrounding wall so as to be separated from and parallel to each other, and a back wall that couples protruding end edge portions of the pair of side walls, and
the wire passing through a wire insertion hole that is formed in the back wall and extending out from the lower surface of the upper electric component block extends to an interior of the box body.

2. The electrical junction box according to claim 1, wherein the extensible tube includes an extensible portion having a bellows structure that has a constant radius and is configured to be extended and contracted in an axial direction thereof.

3. The electrical junction box according to claim 1, wherein a slidable coupling mechanism extending in the up-down direction is provided between the electric component block attachment portion and the upper electric component block, and the upper electric component block is configured to be slidably attached to the electric component block attachment portion from above by the slidable coupling mechanism.

4. The electrical junction box according to claim 1, wherein the upper electric component block can be separated to a third position that does not overlap in the up-down direction with the component attachment portion formed open in the upper surface of the lower electric component block.

5. The electrical junction box according to claim 1, wherein the surrounding wall of the box body that defines the electric component block attachment portion is provided with a cut-out portion that extends across the pair of side walls and that is cut out in a depth extending to the upper surface of the lower electric component block, and the cut-out portion is configured to be covered by a removable lid.

6. The electrical junction box according to claim 1, wherein the back wall is provided so that the entirety of the plurality of the electric component boxes are positioned outward of the back wall in the box body.

7. An electrical junction box comprising:
a box body; an electric component block attachment portion that is provided in the box body, is open upward in the box body, and extends in an up-down direction of the box body; and a plurality of electric component blocks in each of which an electric component is attached to a component attachment portion formed open in an upper surface thereof, the plurality of electric component blocks being attached to the electric component block attachment portion in multiple stages in the up-down direction,
wherein a wire extending out from a lower surface of each of upper electric component blocks is accommodated with an excess length in an extensible tube configured to be extended and contracted in a length direction of the wire,
in an extended condition of the extensible tube, the upper electric component block can be separated from the upper surface of a lower electric component block by extending the excess length of the wire in the extensible tube, and,
in a contracted condition of the extensible tube, the wire is held in the extensible tube in a condition in which the wire meanders and the excess length is absorbed, and the extensible tube is accommodated between the upper electric component block and the lower electric component block,
wherein the box body is provided with a temporary holding projection for temporarily holding the upper electric component block at a position separated from the upper surface of the lower electric component block, and the upper electric component block is provided with an engaging portion that engages with the temporary holding projection, wherein the temporary holding projection protrudes from a second position located further inward of the box body than the electric component block attachment portion.

8. The electrical junction box according to claim 7, wherein the electric component block attachment portion is defined by a surrounding wall of the box body, a pair of side walls that protrude inward of the box body from the surrounding wall so as to be separated from and parallel to each other, and a back wall that couples protruding end edge portions of the pair of side walls, and the second position is located further inward of the box body than the back wall.

9. The electrical junction box according to claim 8, wherein the back wall is provided so that the entirety of the plurality of the electric component boxes are positioned outward of the back wall in the box body.

10. The electrical junction box according to claim 7, wherein the extensible tube includes an extensible portion having a bellows structure that has a constant radius and is configured to be extended and contracted in an axial direction thereof.

11. The electrical junction box according to claim 7, wherein a slidable coupling mechanism extending in the up-down direction is provided between the electric component block attachment portion and the upper electric component block, and the upper electric component block is configured to be slidably attached to the electric component block attachment portion from above by the slidable coupling mechanism.

12. The electrical junction box according to claim 7, wherein the upper electric component block can be separated to a third position that does not overlap in the up-down direction with the component attachment portion formed open in the upper surface of the lower electric component block.

13. An electrical junction box comprising:

a box body; an electric component block attachment portion that is provided in the box body, is open upward in the box body, and extends in an up-down direction of the box body; and a plurality of electric component blocks in each of which an electric component is attached to a component attachment portion formed open in an upper surface thereof, the plurality of electric component blocks being attached to the electric component block attachment portion in multiple stages in the up-down direction, wherein a wire extending out from a lower surface of each of upper electric component blocks is accommodated with an excess length in an extensible tube configured to be extended and contracted in a length direction of the wire, in an extended condition of the extensible tube, the upper electric component block can be separated from the upper surface of a lower electric component block by extending the excess length of the wire in the extensible tube, and, in a contracted condition of the extensible tube, the wire is held in the extensible tube in a condition in which the wire meanders and the excess length is absorbed, and the extensible tube is accommodated between the upper electric component block and the lower electric component block, wherein the box body is provided with a temporary holding projection for temporarily holding the upper electric component block at a position separated from the upper surface of the lower electric component block, and the upper electric component block is provided with an engaging portion that engages with the temporary holding projection, wherein the electric component block attachment portion is defined by a surrounding wall of the box body, a pair of side walls that protrude inward of the box body from the surrounding wall so as to be separated from and parallel to each other, and a back wall that couples protruding end edge portions of the pair of side walls, the temporary holding projection protrudes from a second position located further inward of the box body than the back wall, and the wire passing through a wire insertion hole that is formed in the back wall and extending out from the lower surface of the upper electric component block extends to an interior of the box body.

14. The electrical junction box according to claim 13, wherein the surrounding wall of the box body that defines the electric component block attachment portion is provided with a cut-out portion that extends across the pair of side walls and that is cut out in a depth extending to the upper surface of the lower electric component block, and the cut-out portion is configured to be covered by a removable lid.

15. The electrical junction box according to claim 13, wherein the extensible tube includes an extensible portion having a bellows structure that has a constant radius and is configured to be extended and contracted in an axial direction thereof.

16. The electrical junction box according to claim 13, wherein a slidable coupling mechanism extending in the up-down direction is provided between the electric component block attachment portion and the upper electric component block, and the upper electric component block is configured to be slidably attached to the electric component block attachment portion from above by the slidable coupling mechanism.

17. The electrical junction box according to claim 13, wherein the upper electric component block can be separated to a third position that does not overlap in the up-down direction with the component attachment portion formed open in the upper surface of the lower electric component block.

* * * * *